(12) United States Patent
Kuroda et al.

(10) Patent No.: US 7,256,391 B2
(45) Date of Patent: Aug. 14, 2007

(54) ENCODER FOR DETECTING A POSITION OF A DETECTION TARGET

(75) Inventors: Yoshimi Kuroda, Funabashi (JP); Eiji Yamamoto, Ome (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 10/952,315

(22) Filed: Sep. 28, 2004

(65) Prior Publication Data

US 2005/0072911 A1    Apr. 7, 2005

(30) Foreign Application Priority Data

Oct. 1, 2003 (JP) .............................. 2003-343456
Sep. 8, 2004 (JP) .............................. 2004-261227

(51) Int. Cl.
*G01D 5/34* (2006.01)
(52) U.S. Cl. .............................. 250/231.13; 250/214 R
(58) Field of Classification Search ........... 250/231.13, 250/214 R, 221, 231.18
See application file for complete search history.

(56) References Cited

U.S. PATENT DOCUMENTS 4,034,292 A * 7/1977 McClelland, III ........... 324/157

FOREIGN PATENT DOCUMENTS

| JP | 10-253392 | 9/1998 |
| JP | 3431101 | 5/2003 |

* cited by examiner

*Primary Examiner*—Que T. Le
(74) *Attorney, Agent, or Firm*—Scully, Scott, Murphy & Presser, P.C.

(57) ABSTRACT

A plurality of analog signals are detected in a sensor in accordance with a displacement of a scale on which a pattern with a predetermined cycle is formed. The plurality of analog signals are subjected to signal processing in a signal processing portion, and then output from a sensor head. Setup switching is performed by a setup switching portion provided in the sensor head in such a manner that an output signal at this moment complies with a signal input specification of a positional information output device. Further, the sensor, the signal processing portion and the setup switching portion form an integrated circuit.

27 Claims, 15 Drawing Sheets

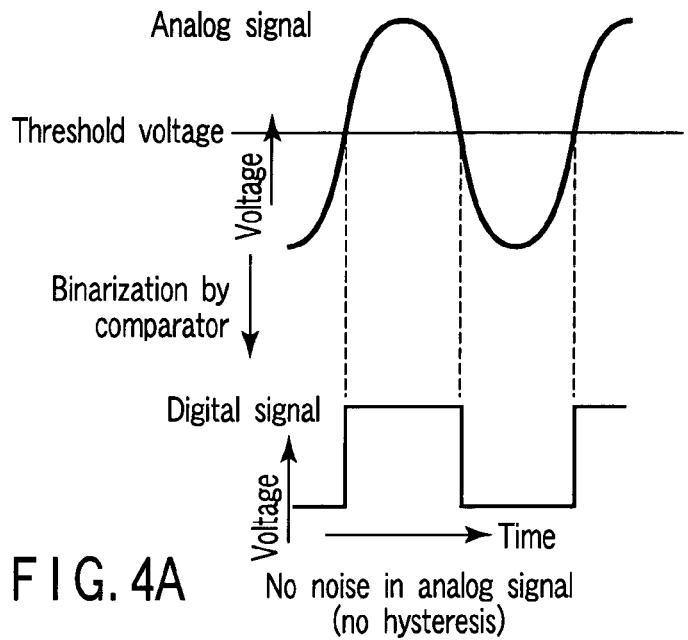
FIG. 4A  No noise in analog signal (no hysteresis)
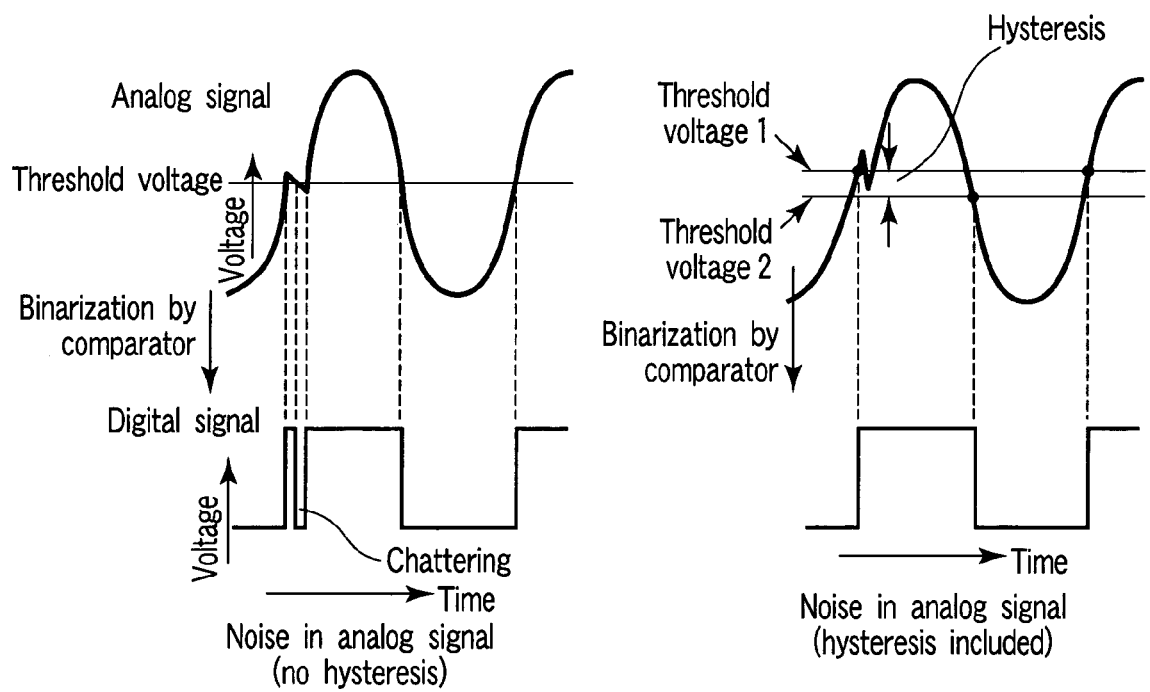
FIG. 4B  Noise in analog signal (no hysteresis)
FIG. 4C  Noise in analog signal (hysteresis included)

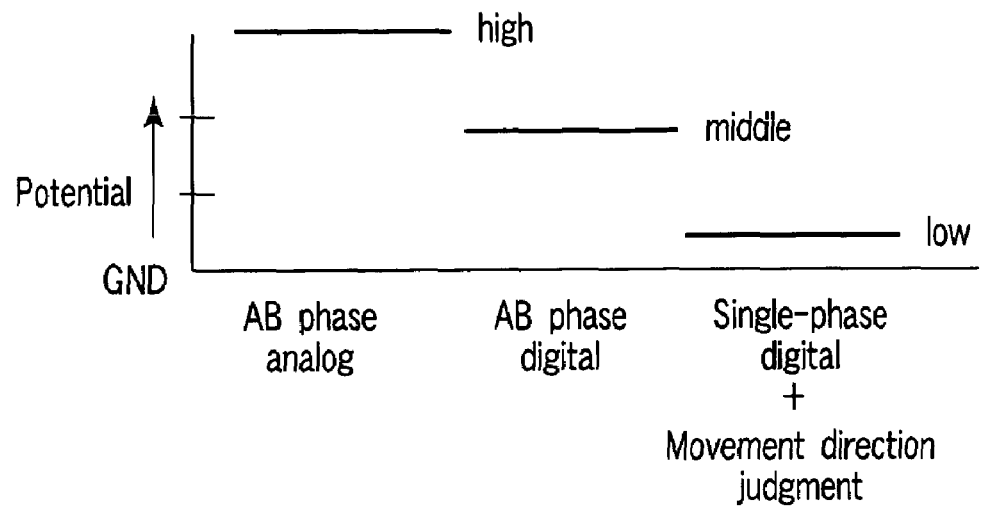
F I G. 12A
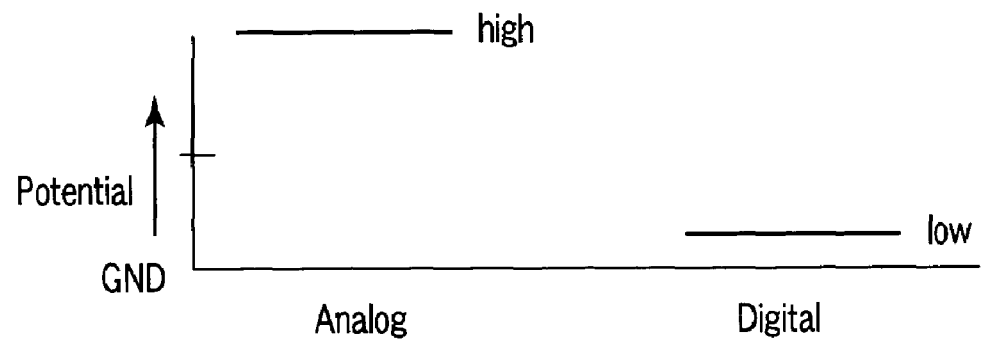
F I G. 12B

| Signal output from head | Package electrode connected with signal output setup switching electrode through wire | | |
|---|---|---|---|
| | None | GND electrode | V potential electrode |
| AB phase analog | ○ | | |
| AB phase digital | | ○ | |
| Single-phase digital + movement direction judgment signal | | | ○ |

FIG. 15A

| Signal output from head | Package electrode connected with reference position analog/digital setup switching electrode through wire | |
|---|---|---|
| | None | GND electrode |
| Reference position analog | ○ | |
| Reference position digital | | ○ |

FIG. 15B

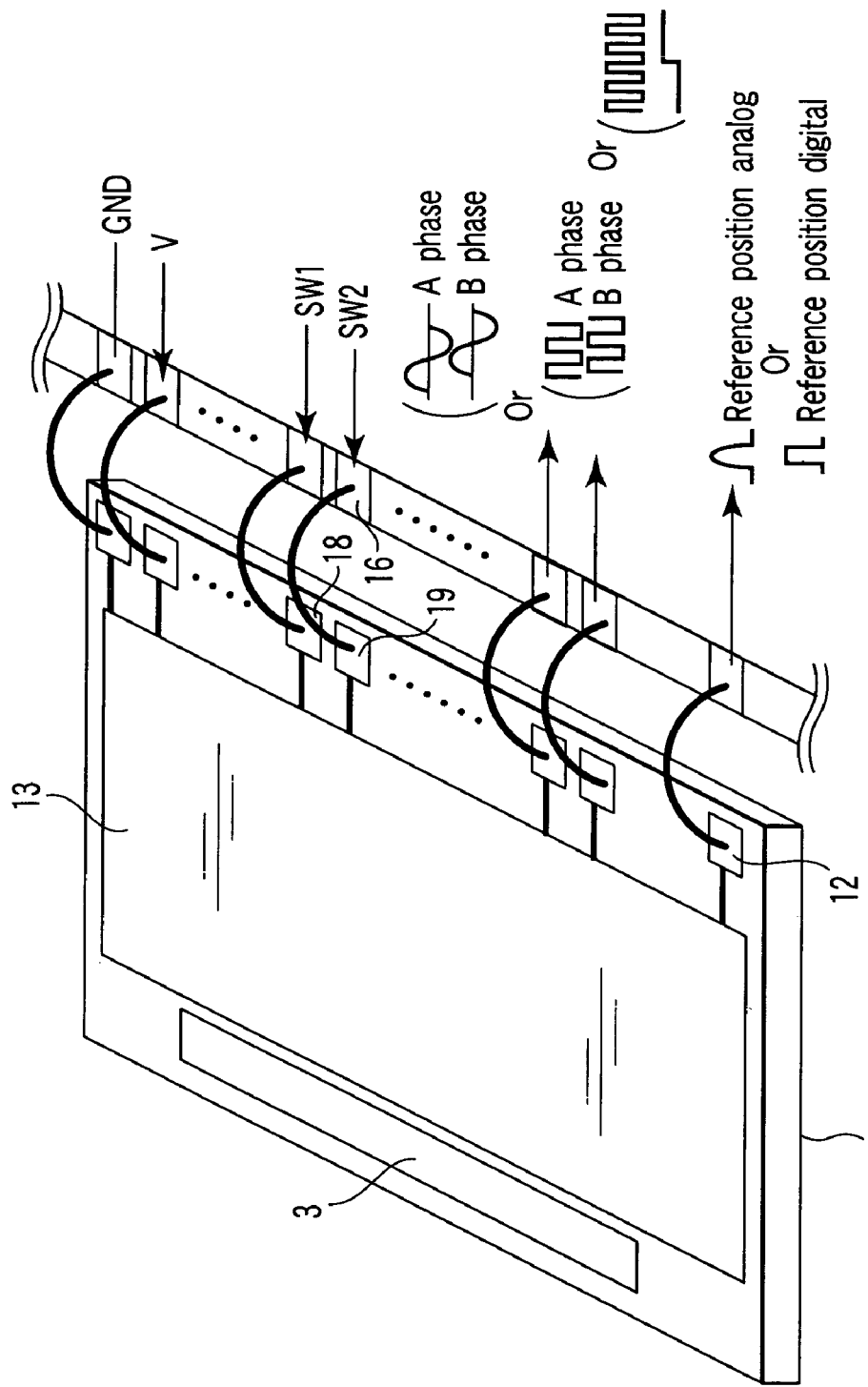
F I G. 16

| Signal output from head | SW1 | SW2 |
|---|---|---|
| AB phase analog (inspection mode) | OFF | OFF |
| AB phase analog (regular mode) | ON | ON |
| AB phase digital (low-resolution mode) | ON | OFF |
| AB phase digital (high-resolution mode) | OFF | ON |

ENCODER FOR DETECTING A POSITION OF A DETECTION TARGET

CROSS-REFERENCE TO RELATED APPLICATIONS

This application is based upon and claims the benefit of priority from prior Japanese Patent Applications No. 2003-343456, filed Oct. 1, 2003; and No. 2004-261227, filed Sep. 8, 2004, the entire contents of both of which are incorporated herein by reference.

BACKGROUND OF THE INVENTION

1. Field of the Invention

The present invention relates to an encoder which detects a position or the like of a detection target.

2. Description of the Related Art

There have been proposed various kinds of encoders which detect, e.g., a movement position of a linearly movable body or a rotational position of a rotationally movable body such as an optical encoder, a magnetic encoder, an electrostatic encoder and others. For example, in an encoder proposed in Jpn. Pat. Appln. KOKAI Publication No. 10-253392, a specification of the encoder can be readily changed by adopting a detachable signal processing circuit which digitizes an analog signal detected by a sensor. FIGS. 20A and 20B show block diagrams of such an encoder.

FIG. 20A shows an example of an encoder having a signal processing circuit 103 attached in a sensor head 101. In this example, two-phase analog signals (FIG. 20A shows one signal alone) according to movement of a detection target are output to the signal processing circuit 103 from a sensor signal detection amplification circuit 102. Here, the two-phase analog signals are generally periodic signals whose phases are shifted by 90 degrees with respect to each other.

The signal processing circuit 103 is a circuit which digitizes the two-phase analog signals which are input thereto. Here, the signal processing circuit 103 has an interpolation division circuit which subjects to interpolation division processing the analog signals which are input thereto. An interpolation position in one cycle of the analog signal can be obtained by the interpolation division circuit. For example, assuming that the two-phase analog signals are an A phase analog signal (Vsinθ) and a B phase analog signal (Vcosθ) which are generally used as encoder signals and Va and Vb are values obtained by converting these analog signals into digital signals, the interpolation position in one cycle can be obtained based on the following expressions:

$$Va/Vb = V\sin\theta / V\cos\theta = \tan\theta$$

$$\theta = \tan^{-1}(Va/Vb)$$

After the analog signals are digitized in this manner, the digital signals are output to a control device 104 from the sensor head 101.

On the other hand, FIG. 20B shows an example of an encoder in which a signal processing circuit 103 is provided in a control device 104. In this example, the signal processing circuit 103 is not attached in the sensor head 101. That is, in the example of FIG. 20B, after the analog signals are output to the control device 104 from the sensor head 101, they are digitized by the signal processing circuit 103 in the control device 104.

Here, in the encoder proposed in Jpn. Pat. Appln. KOKAI Publication No. 10-253392, a plurality of signal processing circuits must be prepared in advance in accordance with a signal input specification of the control device 104. That is, in order to cope with a specification which is not previously prepared, a signal processing circuit which can support this specification must be additionally manufactured.

Further, when a cyclic pattern of a scale is, e.g., 20 μm, signals in various output modes, e.g., a low-resolution digital signal output mode with a resolution of approximately 5 μm, a high-resolution digital signal output mode with a resolution of approximately 1 μm and an AB phase analog signal mode which does not perform digital conversion are required based on the use application of an encoder, the specification of a control circuit 105 or the like at that time in accordance with the intended use. It is preferable that such signals in various output modes can be generated and output by one type of sensor head.

BRIEF SUMMARY OF THE INVENTION

It is an object of the present invention to provide an encoder which can cope with an apparatus having diverse functions and performances by one type of sensor head.

An encoder according to a first aspect of the present invention, there is provided an encoder comprising: a scale has a pattern with a predetermined cycle is provided; and a sensor head having an integrated circuit which includes at least a signal processing portion which subjects, to signal processing, a plurality of analog signals in accordance with a relative displacement with the scale to thereby generate an output signal, and a setup switching portion which performs at least one setup switching concerning the output signal or the signal processing.

An encoder according to a second aspect of the present invention, there is provided an encoder comprising: a scale on which a pattern with a predetermined cycle is formed; and a sensor head which has an analog signal processing circuit which subjects, to signal processing, a plurality of analog signals in accordance with a relative displacement with the scale and a digital signal processing circuit which generates a digital signal from the plurality of analog signals, wherein the analog signal processing circuit and the digital signal processing circuit comprises an integrated circuit, the integrated circuit independently has an output terminal for an output signal from the analog signal processing circuit and an output terminal for an output signal from the digital signal processing circuit, and at least one of the output terminal for an output signal from the analog signal processing circuit and the output terminal for an output signal from the digital signal processing circuit is connected with an external wiring through an electroconductive wire.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A to 4C are views illustrating an operation of a hysteresis setup switching portion;

FIG. 12A is a view showing a relationship between a potential of a signal output setup switching electrode and an output signal mode according to this potential;

FIG. 12B is a view showing a relationship between a potential of a reference position analog/digital setup switching electrode and an output signal mode according to this potential;

FIG. 15A is a view showing a relationship between a potential of a package electrode and an output signal mode according to this potential;

FIG. 15B is a view showing a relationship between a potential of the package electrode and an output signal mode of a reference position signal according to this potential;

FIG. 16 is a schematic view showing an IC in a sensor head in an encoder according to a sixth embodiment of the present invention;

DETAILED DESCRIPTION OF THE INVENTION

First Embodiment

Figure 1:
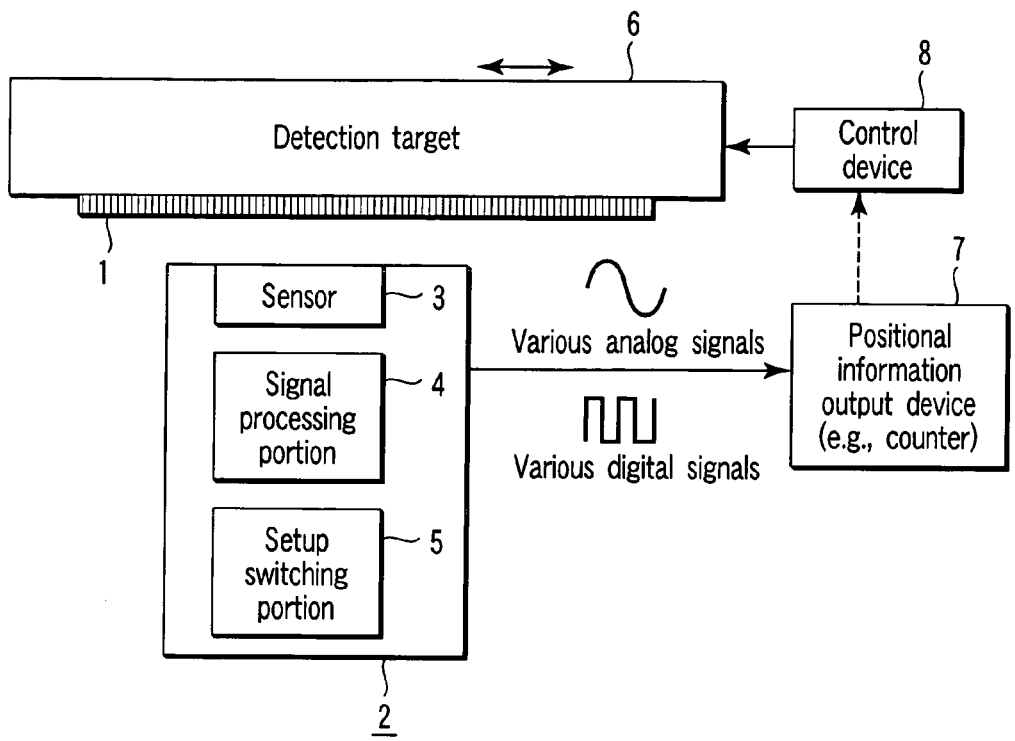
FIG. 1 is a block diagram showing a structure of an encoder according to a first embodiment of the present invention.

FIG. 1 is a structural view of an encoder according to a first embodiment of the present invention. That is, the encoder according to the first embodiment comprises a scale 1 and a sensor head 2. Furthermore, FIG. 1 also shows a positional information output device 7 which detects positional information of a detection target from an output from the sensor head 2, and a control device 8 which performs a positional control over the detection target 6 based on an output from the positional information output device 7.

The scale 1 is arranged on the moving detection target 6, and a physical, electrical or optical pattern with a predetermined cycle is formed thereto. The sensor head 2 detects movement of a cyclic pattern due to movement of the detection target 6, subjects this detection result to signal processing, and outputs it to the positional information output device 7. Here, the sensor head 2 comprises a sensor 3, a signal processing portion 4, and a setup switching portion 5. Moreover, the signal processing portion 4 and the setup switching portion 5 are constituted of an integrated circuit.

The sensor 3 is arranged to be opposed to the scale 1, detects movement of a cyclic pattern of the scale 1, generates a periodic analog signal according to the detected movement, and outputs it to the signal processing portion 4. Here, as a detection mode of the sensor 3, there are modes which are of, e.g., an optical type, a magnetic type or an electrostatic type, and a cyclic pattern of the scale 1 also has an optical, magnetic or electrical pattern in accordance with a detection mode of the sensor 3.

The signal processing portion 4 processes the periodic analog signal which is input from the sensor 3. Here, in order to generate and output various analog signals or various digital signals according to an input signal specification of the positional information output device 7 in the signal processing portion 4, the setup switching portion 5 switches the setup of the signal processing portion 4. That is, the setup switching portion 5 is provided in order to switch the setup of a signal which is output from the sensor head 2. By this setup switching portion 5, analog signals or various digital signals can be generated in various signal processing modes in the signal processing portion 4, and signals can be output from the sensor head 2 in various signal output modes.

Here, an interpolation division circuit may be provided in the signal processing portion 4. That is, when generating digital signals in the signal processing portion 4, if a division number of the interpolation division circuit can be set and switched, digital signals having different resolutions can be output to the positional information input device 7 from the sensor head 2.

The positional information output device 7 comprises a counter or the like, detects positional information of the detection target 6 based on a signal which is input from the sensor head 2, and outputs the detected positional information to the control device 8. The control device 8 controls movement of the detection target 6 based on the positional information which is input thereto.

As described above, according to the first embodiment, many types of signals can be generated and output by using one type of sensor head. As a result, one type of sensor head can cope with many positional information output devices 7 or control devices 8 having different signal input specifications. Additionally, in the case of increasing, e.g., a control accuracy of the detection target 6, performing setup switching of the setup switching portion 5 in the sensor head 2 can suffice. Therefore, one type of sensor head can support, and hence the specification can be inexpensively changed.

Here, each structure in the first embodiment can be of course modified and changed in many ways. For example, FIG. 1 shows an example in which the detection target 6 makes linear movement, but the first embodiment is not restricted thereto, and the detection target 6 may make rotational movement. In such a case, a rotational position of the detection target 6 is detected by constituting the scale 1 having a physical, electrical or optical pattern with a predetermined period circularly formed thereto. Further, a speed of the detection target 6 can be detected by using the encoder depicted in FIG. 1. In this case, it is good enough to detect, e.g., a change in positional information with time which is detected by the positional information output device 7.

Second Embodiment

Figure 2:
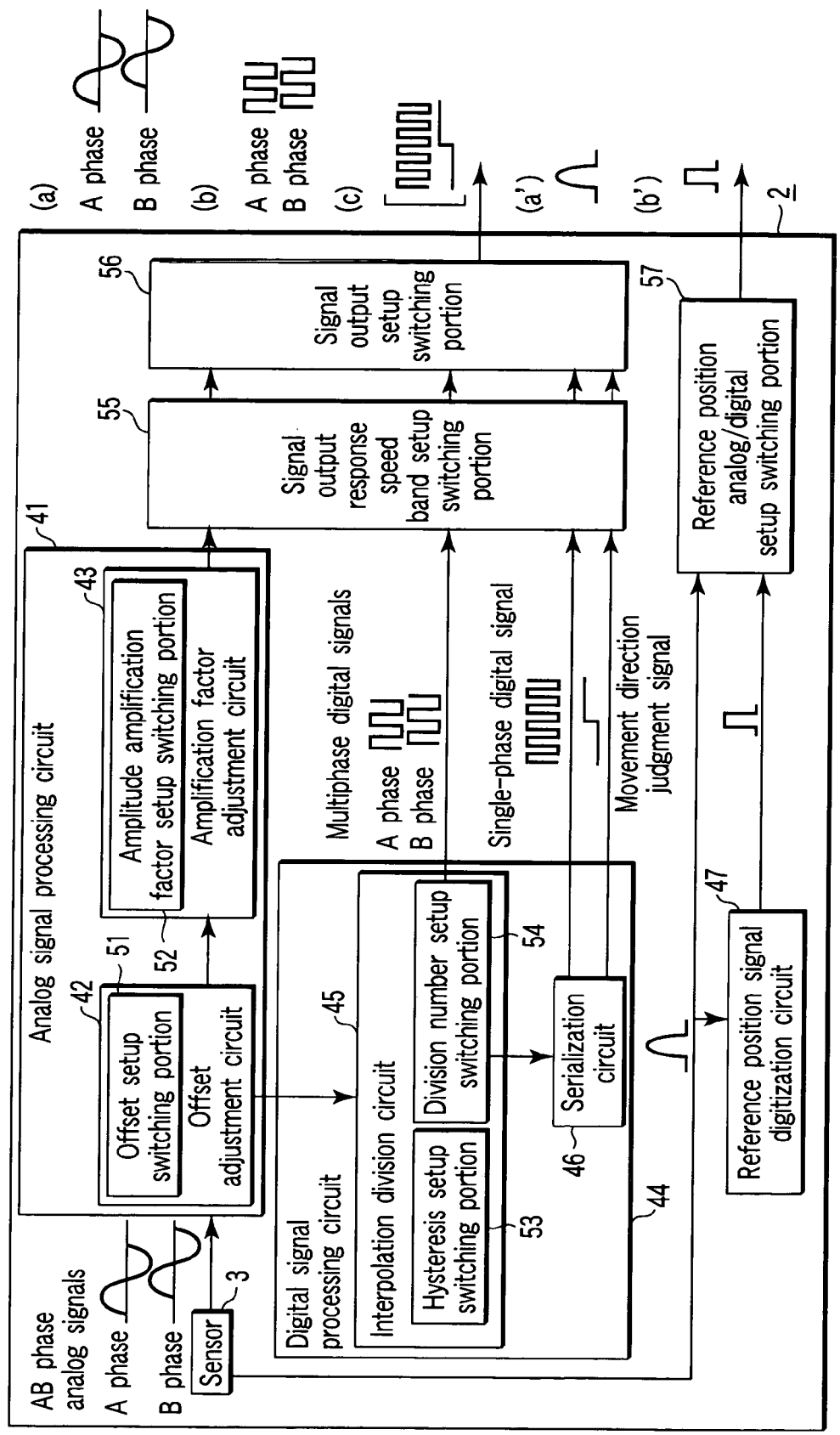
FIG. 2 is a block diagram showing an internal structure of a sensor head in an encoder according to a second embodiment of the present invention.

A second embodiment according to the present invention will now be described. FIG. 2 is a block diagram showing a detailed structure in the sensor head 2 depicted in FIG. 1. Here, the structures of a scale 1 arranged on the detection target 6, a positional information output device 7 and a control device 8 are the same as those described in conjunction with the first embodiment, thereby eliminating the illustration.

Here, an analog signal processing circuit 41, an offset adjustment circuit 42, an amplification factor adjustment circuit 43, a digital signal processing circuit 44, an interpolation division circuit 45, a serialization circuit 46 and a reference position signal digitization circuit 47 in FIG. 2 are included in the signal processing portion 4 depicted in FIG. 1. Furthermore, an offset setup switching portion 51, an amplitude amplification factor setup switching portion 52, a hysteresis setup switching portion 53, a division number setup switching portion 54, a signal output response speed band setup switching portion 55, a signal output setup switching portion 56 and a reference position analog/digital setup switching portion 57 are included in the setup switching portion 5 depicted in FIG. 1.

A description will now be given as to structures and effects of FIG. 2 in accordance with a flow of signals which are output from the sensor 3. Two-phase analog signals which are so-called AB phase analog signals whose phases are shifted 90 degrees with respect to each other are output from the sensor 3 in accordance with movement of the detection target 6.

Figure 3:
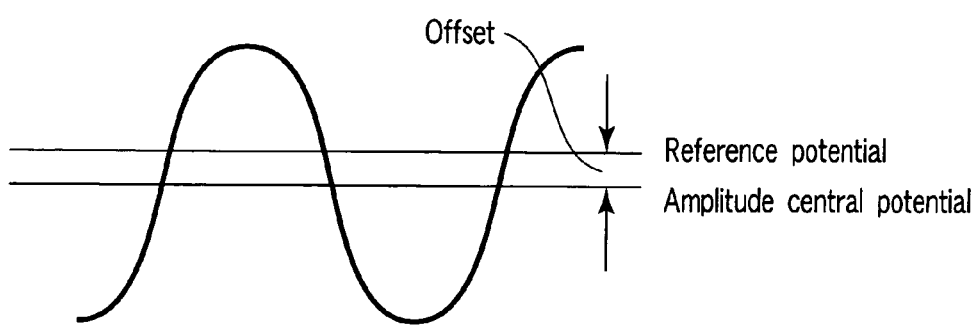
FIG. 3 is a view illustrating an operation of an offset setup switching portion.

Here, such an offset as shown in FIG. 3 with which an amplitude central potential of a signal deviates from a reference potential by superimposition of a direct-current component on the signal may be generated in the AB phase analog signals which are output from the sensor 3. In order to adjust this offset, the AB phase analog signals output from the sensor 3 are first input to the offset adjustment circuit 42 in the analog signal processing circuit 41. Here, in the second embodiment, the offset setup switching portion 51 is provided in the offset adjustment circuit 42, and a magnitude of the offset of the AB phase analog signals can be subjected to setup switching by this offset setup switching portion 51. Here, as an example of an offset quantity adjustment method, there is a mode by which several types of potential generation circuits having different offset adjustment quantities are formed in the offset adjustment circuit 42 in advance, and the offset quantity is switched to a desired offset quantity by switching of an electroconductive pattern or by using a logic circuit in the offset setup switching portion 51.

By reducing the offset of the analog signals as much as possible in this manner, the interpolation accuracy in the interpolation division circuit 45 can be then improved, thereby obtaining a sensor head with the excellent accuracy.

Here, "setup switching" in the offset setup switching portion 51 includes a case in which the setup of a product is once made in a manufacturing process and this setup can never be changed as well as a case in which the setup can be always switched. This can be also applied to another setup switching portion which will be described later.

The AB phase analog signals subjected to offset adjustment are output to the system of the digital signal processing circuit 44 which generates various digital signals and the amplification factor adjustment circuit 43 which generates various analog signals.

First, the system of the digital signal processing circuit 44 will be described. The digital signal processing circuit 44 is a circuit which digitizes the AB phase analog signals input thereto. In the digital signal processing circuit 44, input analog signals are converted into digital signals by using a predetermined division number in the interpolation division circuit 45, for example. It is to be noted that conversion into digital signals in the interpolation division circuit 45 includes conversion into digital signals by simply binarizing a plurality of analog signals. Here, in the second embodiment, the division number setup switching portion 54 is provided in the interpolation division circuit 45, and a division number for digitization can be subjected to setup switching. For example, when an analog signal corresponding to a movement quantity of 20 μm in one cycle is divided into two, i.e., simply binarized, a digital signal having one pulse corresponding to a movement quantity of 10 μm can be obtained. When the analog signal is divided into 10, a digital signal having one pulse corresponding to a movement quantity of 2 μm can be obtained. As interpolation division modes in this example, there are, e.g., a resistance division mode using a resistance, a phase tracking mode using an ROM table, and a mode which obtains a rotational angle of a Lissajous figure of A phase and B phase analog signals by a calculation. In the resistance division mode, switching of a resistance division number can be performed by switching of an electroconductive pattern or using a logic circuit. Furthermore, in the phase tracking mode using an ROM table, switching of the ROM table can be performed by switching of an electroconductive pattern or by using a logic circuit. In the mode which obtains a rotational angle by calculation, switching of a calculation coefficient can be carried out by switching of an electroconductive pattern or by using a logic circuit. Moreover, in regard to simple binarization, there is a mode using a comparator.

Additionally, in the interpolation division circuit 45 is provided a hysteresis setup switching portion 53 which sets a magnitude of a tolerance against noises included in an analog signal at the time of digitization. A hysteresis in the hysteresis setup switching portion 53 means a hysteresis which is given to a threshold voltage which is generally used when binarizing an analog signal. Here, the hysteresis will now be described in detail.

FIG. 4A is a view showing a change in waveform when binarization is carried out by a comparator in a state that an analog signal contains no noise. In this case, since the analog signal does not contain any noise, binarization processing can be successfully carried out without giving a hysteresis to a threshold voltage. On the other hand, FIG. 4B is a view showing a change in waveform when binarization is carried out without giving a hysteresis to a threshold voltage in a state that noises are superimposed on an analog signal. In this case, there occurs a so-called chattering phenomenon that a signal having a noise component is accidentally binarized. In such a case, erroneous counting of pulses is produced in the positional information output device 7, and positional information detected in the positional information output device 7 is thereby becomes incorrect. Moreover, a so-called stickslip phenomenon that the detection target 6 repeats reciprocating movement is produced depending on how the control of the control device 8 is carried out.

In order to solve this problem, a hysteresis is given to a threshold voltage at the time of binarization like a threshold voltage 1 and a threshold voltage 2 shown in FIG. 4C. By doing so, the chattering phenomenon can be prevented. Here, since a pulse width when digitization is carried out becomes uneven as the hysteresis is increased, a position detection accuracy of the encoder is degraded. Therefore, it is desirable to set a magnitude of the hysteresis in accordance with a magnitude of the noise superimposed on the input analog signal and a required detection accuracy. Thus, in the second embodiment, the magnitude of the hysteresis is switched by the hysteresis setup switching portion 53. Here, as an example of a hysteresis magnitude adjustment method, there is a mode by which several different types of feedback resistances are formed in a hysteresis adjustment operational amplifier circuit in advance and the magnitude of the hysteresis is switched to a desired magnitude by switching an electroconductive pattern or by using a logic circuit.

Signals subjected to interpolation division and digitization in the interpolation division circuit 45 (which will be referred to as AB phase digital signals hereinafter) are output to the signal output response speed band switching portion 55 and the serialization circuit 46.

Figure 5:
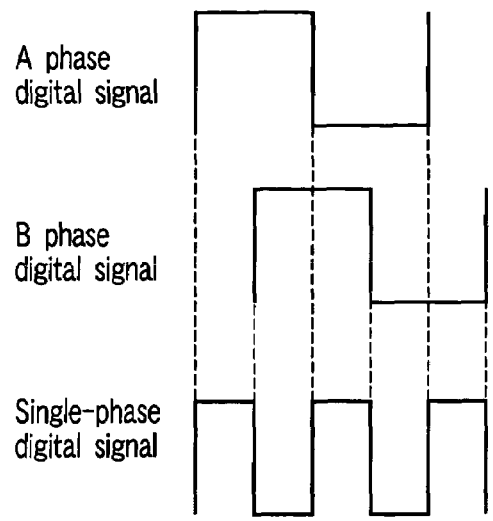
FIG. 5 is a view illustrating an operation of a serialization circuit.
Figures 6A, 6B:
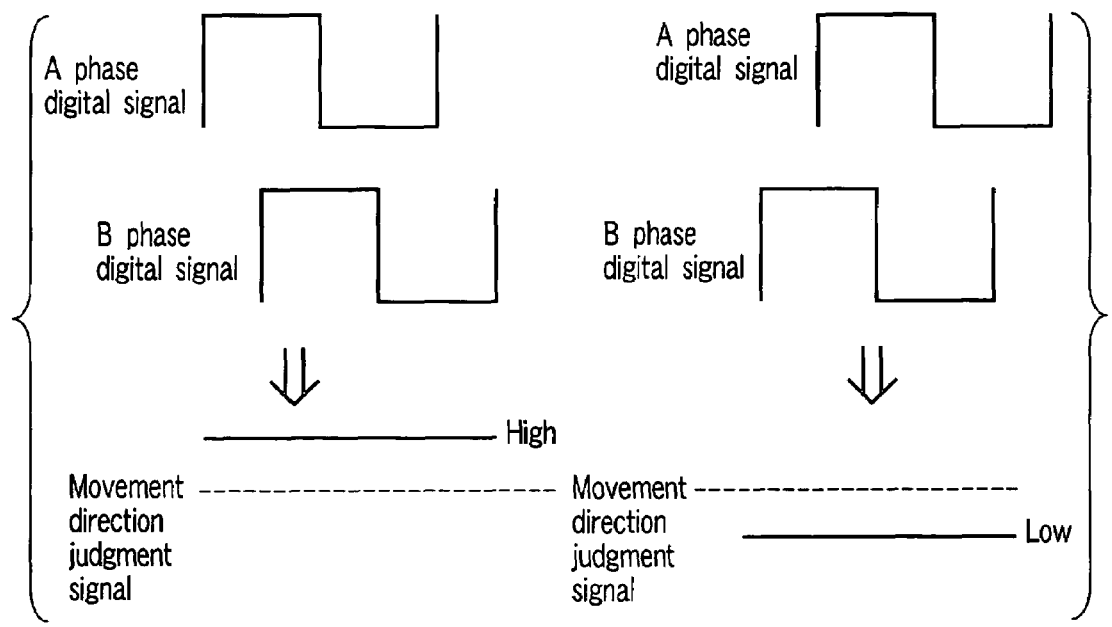
FIGS. 6A and 6B are views illustrating a movement direction judgment signal generation technique.

As an example of the serialization circuit 46, there is carried out processing which combines the AB phase digital signals in order to generate one digital signal (this digital signal will be referred to as a single-phase digital signal hereinafter) as shown in FIG. 5. Here, in the AB phase digital signals, a movement direction of the detection target 6 is detected based on a phase difference between the respective digital signals. That is, if the AB phase digital signals are simply combined to generate the single-phase digital signal, a phase difference between the two signals, i.e., information of the movement direction becomes unclear. Therefore, serialization circuit 46 also carries out processing of generating a movement direction judgment signal from a phase relationship between the A phase digital signal and the B phase digital signal having different phases and outputting this movement direction judgment signal and the single-phase digital signal as one set of signals as shown in, e.g., FIG. 6. The one set of signals processed in the serialization circuit 46 in this manner is output to the signal output response speed band switching portion 55.

Here, a circuit which generates digital signals according to a plurality of output formats, e.g., a format for conversion into the AB phase digital signals, a format for conversion into a single-phase digital signal, a format for conversion into a multi-bit signal or a format for conversion into a Universal Serial Bus (USB) interface compatible signal may be formed in the digital signal processing circuit 44 in advance, and a switching portion which selects at least one of these output formats may be provided.

A description will now be given as to the amplification factor adjustment circuit 43. The amplification factor adjustment circuit 43 is a circuit which adjusts amplitudes of the input AB phase analog signals. That is, the amplitude amplification factor setup switching portion 52 is provided to the amplification factor adjustment circuit 43, and setups of amplitudes of the AB phase analog signals are switched in accordance with the setup of this amplitude amplification factor setup switching portion 52. Here, as an example of the amplitude amplification factor adjustment method, there is a mode by which several different types of feedback resistances are formed in an amplitude amplification operational amplifier circuit in advance and the amplification factor is switched to a desired amplification factor by switching an electroconductive pattern or by using a logic circuit. As an example of switching the setup of the amplitude, there is, e.g., switching between a regular mode by which an amplitude can be set to one desired by a user and an inspection mode by which the amplitude can be set to one in a shipping inspection of the sensor head. The AB phase analog signals whose amplitudes are set are output to the signal output response speed band switching portion 55 in this manner.

The signal output response speed band switching portion 55 sets a response speed band of an output signal in accordance with a processing circuit specification of the device (positional information output device 7 in FIG. 1) as a device which receives a signal output from the sensor head 2. For example, if a signal is output from the sensor head 2 at a speed higher than a signal response speed of a counter in the positional information output device 7, the counter cannot follow up, and positional information detected by the positional information output device 7 thereby becomes incorrect. Accordingly, in the second embodiment, the positional information is prevented from becoming incorrect by switching an output response speed band of the signal output from the sensor head 2 by the signal output response speed band switching portion 55 in accordance with a specification of the positional information output device 7. Here, as an example of a response speed band adjustment method, there is a mode by which several types of output synchronization clock circuits having different clock frequencies are formed in advance and a response speed band is switched to a desired one by switching an electroconductive pattern or by using a logic circuit.

It is to be noted that the signal output response speed band switching portion 55 may be provided in the analog signal processing circuit 41 or the digital signal processing circuit 44, and a response speed band may be switched every time an analog signal or a digital signal is processed.

The signal whose output response speed band was subjected to setup switching in the signal output response speed band switching portion 55 is output to the signal output setup switching portion 56. The signal output setup switching portion 56 selects at least one of a set of AB phase analog signals, a set of AB phase digital signals and a set of single-phase digital signal and a movement direction judgment signal, and outputs the selected signals to the positional information detection device 7. At this time, two or more sets of signals may be simultaneously output. As a result, a position can be detected by using, e.g., a digital signal and stop servo can be applied by using an analog signal, for example. A stop control without the stickslip phenomenon due to a digital signal control becomes possible.

Moreover, the sensor 3 includes a function for detecting a reference position of the scale 1. That is, a reference position analog signal output from the sensor 3 is digitized in the reference position signal digitization circuit 47. In the second embodiment, the reference position signal output from the sensor head 2 can be switched between an analog signal and a digital signal. This switching is performed in accordance with the setup of the reference position analog/digital setup switching portion 57. Here, as conversion into a digital signal from the reference position analog signal, there is a technique using a comparator like binarization of the AB phase analog signals.

As described above, according to the second embodiment, it is possible to output signals by one type of sensor head in various signal output modes such as those for various AB phase analog signals, various AB digital signal, various single-phase digital signals and analog or digital reference position signals. As a result, one type of sensor head can deal with many positional information output devices 7 or control devices 8 having different signal input specifications. Moreover, in case of, e.g., increasing the control accuracy of the detection target 6, switching the setups of various setup switching portions in the sensor head 2 can suffice. Therefore, specifications can be inexpensively changed since one type of sensor head can support.

Additionally, since the offset can be reduced as much as possible by the offset setup switching portion 51 and the interpolation accuracy in the interpolation division circuit 45 can be thereby improved, the further accurate sensor head can be obtained.

Further, the amplitude can be readily changed depending on the shipping inspection mode and the regular mode of the sensor head by the amplitude amplification factor setup switching portion 52. As a result, performing the inspection in the inspection mode in which the standard width is narrower than the AB phase analog amplitude standard can avoid a trouble due to an AB phase amplitude error in the regular mode.

Here, each structure in the second embodiment can be of course modified and changed in many ways. For example, all of the respective setup switching portions do not have to be provided in the sensor head 2. That is, even if some of the structures in FIG. 2 are eliminated, there is no problem as long as desired sensor performances are satisfied. Furthermore, for example, the signal output setup switching portion 56 may be arranged immediately after the AB phase analog signals output from the sensor 3, or the signal output response speed band setup switching portion 55 may be arranged after the digital signal processing system alone without being arranged after the analog signal processing system. That is, it is desirable to arrange such circuits in accordance with types or the number of required setup switching portions.

Moreover, as an amplitude which is set in the amplitude amplification factor setup switching portion 52, an amplitude for a setup mode used when setting up the scale 1 and the sensor head 2 may be included. That is, by performing the setup while confirming a signal for this setup mode, troubles due to AB phase amplitude errors in the regular mode can be suppressed.

Additionally, the sensor head may have a function which accurately detects a reference position by synchronizing the reference position signal with the AB phase analog signals, and a switching function which is required to set a synchronization position at this time.

Further, as analog signals, the second embodiment is not restricted to the AB phase signals whose phases are shifted 90 degrees with respect to each other, and a plurality of analog signals having predetermined phase differences may be used. Furthermore, as digital signals, multiphase signals (which will be referred to as multiphase digital signals) may be used in accordance with such analog signals.

Figure 7:
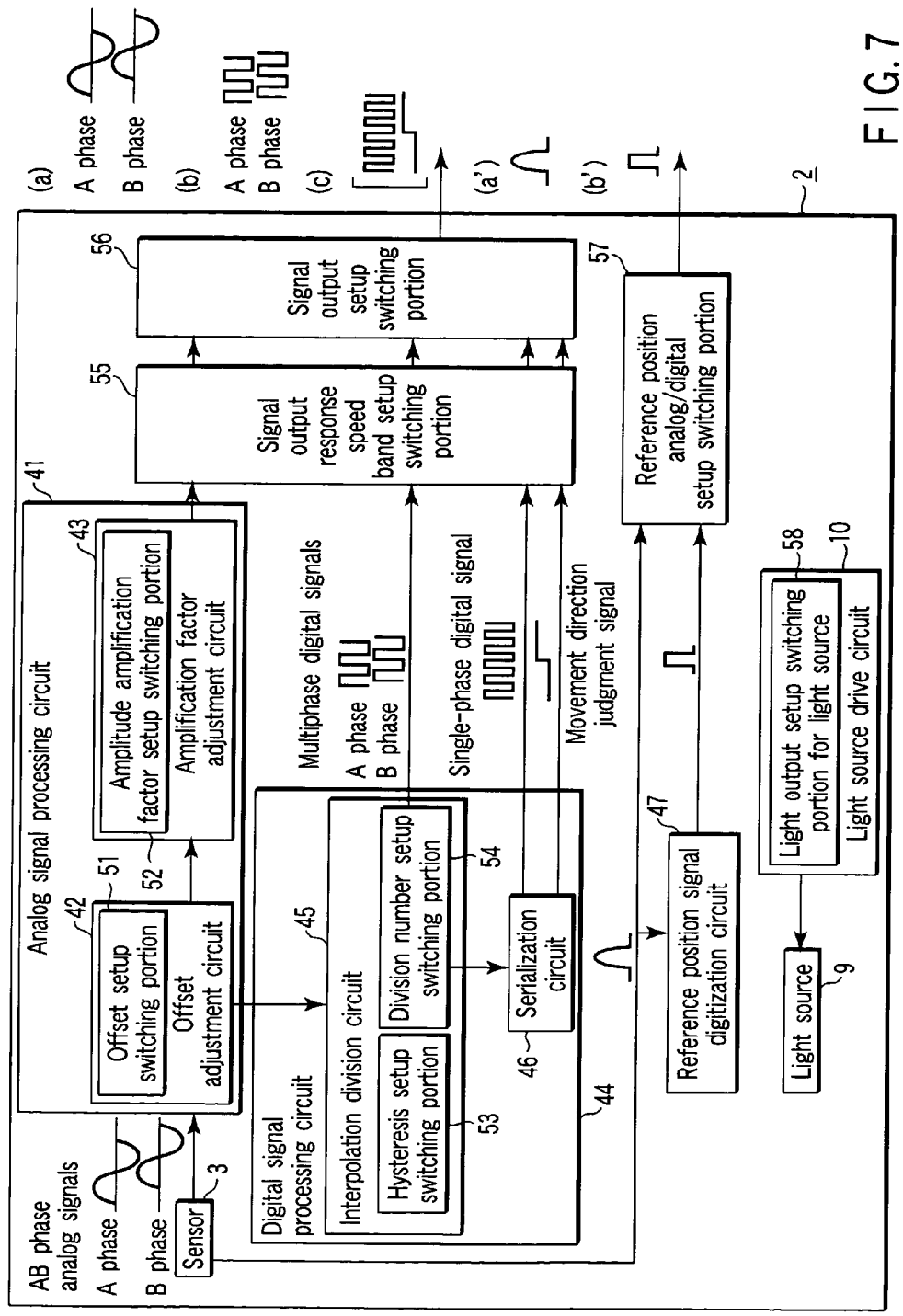
FIG. 7 is a block diagram when the sensor head according to the second embodiment is constituted of an optical sensor head.

Moreover, the encoder in the second embodiment may be an optical encoder. FIG. 7 shows a block diagram of an optical sensor head when the encoder of the second embodiment is applied to an optical encoder. Here, a light sensitive sensor is used as a sensor 3 of the optical encoder, and a scale on which an optical pattern with a predetermined cycle is formed is used as a scale 1. In FIG. 7, a function which switches a light output from a light source 9 by using a light output setup switching portion 58 of the light source is provided in accordance with an amplitude specification of AB phase analog signals. As a result, a light output can be increased to an appropriate level when an analog signal level output from the sensor head is small, or a light output can be lowered when an analog signal level output from the sensor head is too large and, e.g., a circuit potential is nearly saturated. In terms of a life duration of the light source, setting the light output small is good, but the light output can be set in accordance with a use application. For example, in cases where high division of analog signals with a high resolution is required, an analog signal level is increased by setting the light output large. Additionally, a light intensity which enters the light sensitive sensor can be always kept constant or an amplitude of the analog signal can be always kept constant by an auto power control mode, and the highly accurate optical encoder can be obtained by stabilizing an encoder signal.

Third Embodiment

Figure 8:
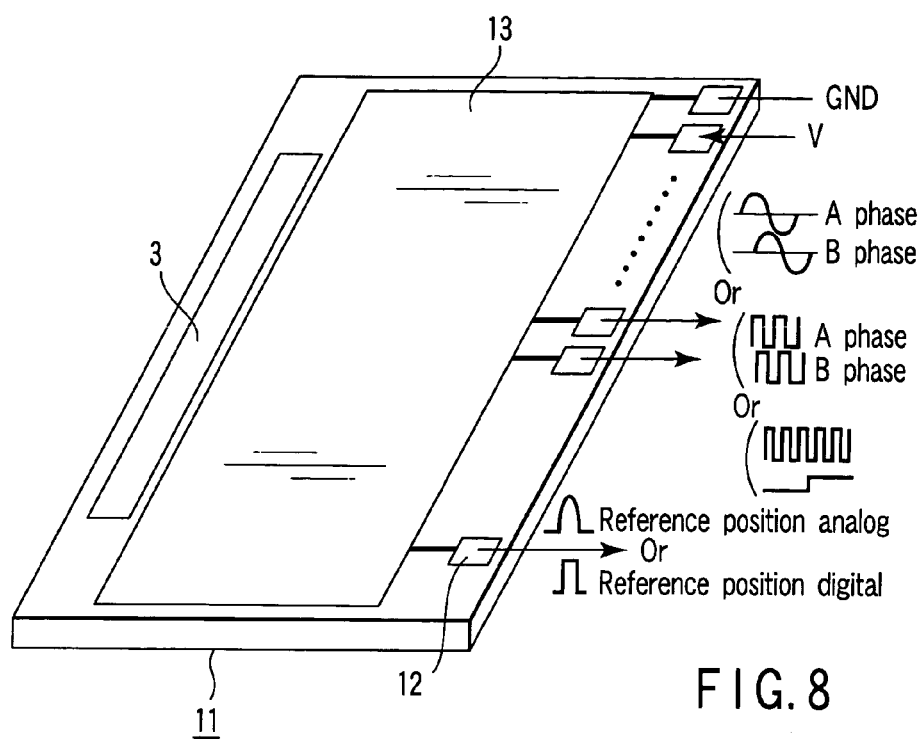
FIG. 8 is a schematic view of an IC in a sensor head in an encoder according to a third embodiment of the present invention.

A third embodiment according to the present invention will now be described. FIG. 8 is a schematic view showing a state in which a sensor 3, a signal processing portion 4 and a setup switching portion 5 in a sensor head are actually formed as an IC. That is, FIG. 8 shows the signal processing portion 4 and the setup switching portion 5 as an integrated portion 13. Further, extraction electrodes 12 are electrically connected with this integrated portion 13. Here, FIG. 8 shows, as examples of the extraction electrodes 12, a voltage input electrode (V), a ground electrode (GND), an output electrode for at least one of a set of AB phase analog signals, a set of AB phase digital signals and a set of single-phase digital signals, and a reference position signal output electrode.

Here, structures of the scale 1, the positional information output device 7 and others are the same as those in the first embodiment, and a flow of signals to the various setup switching portions from the sensor 3 is the same as the second embodiment, thereby eliminating the explanation.

As described above, the setup switching portion 5 is constituted in an electronic circuit in the integrated portion 13. The setup switching in the setup switching portion 5 is carried out by, e.g., switching the setup of a connection structure of a thin-film electroconductive pattern of the electronic circuit. This connection structure is obtained by setting up a structure of a mask pattern for photolithography when forming the thin-film electroconductive pattern at an IC manufacturing step or the like. Alternatively, it may be performed by disconnecting the thin-film electroconductive pattern by using a laser or the like.

By performing the setup switching of the setup switching portion 5 in this manner, the setup switching of the setup switching portion 5 can be carried out by switching the connection structure of the thin-film electroconductive pattern even if all the same elements are used in the IC 11. Here, the thin-film electroconductive pattern disconnection processing using a laser or the like may be executed on a last stage of the IC manufacture or the sensor head manufacture.

It is to be noted that a thin-film electroconductive pattern disconnection mode is not restricted to utilization of a laser, and a fuse may be formed at a part of the electroconductive pattern and this fuse may be electrically disconnected. Further, it is needless to say that any other physical mode, thermal mode, optical mode and the like may be used.

As described above, according to the third embodiment, it is possible to provide a sensor head which can cope with various signal output modes, e.g., a mode for various AB phase analog signals, a mode for various AB digital signals, a mode for various single-phase digital signals, a mode for analog or digital reference position signals and others by just switching the connection structure of the thin-film electroconductive pattern even if all the same elements are used in the IC 11. As a result, the sensor head can be mass-produced, which results in a reduction in cost. Furthermore, the sensor head can be reduced in size by forming the signal processing portion or the setup switching portion as an IC.

Here, each structure of the third embodiment can be of course modified and changed in many ways. For example, all of the setup switching portions do not have to be provided in the IC 11, and arrangements of various setup switching portions in the IC can be changed. That is, even if some of structures in FIG. 2 are eliminated or their arrangements are different, realizing the sensor head satisfying desired sensor performances can suffice.

Moreover, the analog signals are not restricted to the AB phase signals whose phases are shifted 90 degrees from each other, and they may be a plurality of analog signals having predetermined phase differences. The digital signals may be multiphase signals in accordance with such analog signals.

Additionally, structures of the various setup switching portions are not restricted to those formed by using a thin-film electroconductive pattern. For example, there can be considered a conformation in which a non-volatile memory such as an EPROM or an EEPROM may be provided in the IC and setup information of the setup switching portion 5 is recorded in this non-volatile memory. In such a case, setup switching of various setup switching portions can be performed by changing setup information which is recorded in the non-volatile memory. Here, a recording medium in which setup information of the setup switching portion 5 is recorded is not restricted to the non-volatile memory.

Further, the sensor 3 and the integrated portion 13 may be formed of different members, and a part of the signal processing portion 4 may be a member different from the integrated portion 13.

Furthermore, various output signals such as AB phase analog signals, AB phase digital signals, single-phase digital signals, analog or digital reference position signals and others may be allowed to be output from independent extraction electrodes 12, and desired signals may be allowed to be output at the same time. As a result, for example, AB phase analog signals and AB phase digital signals can be output from the sensor head at the same time.

Figure 9:
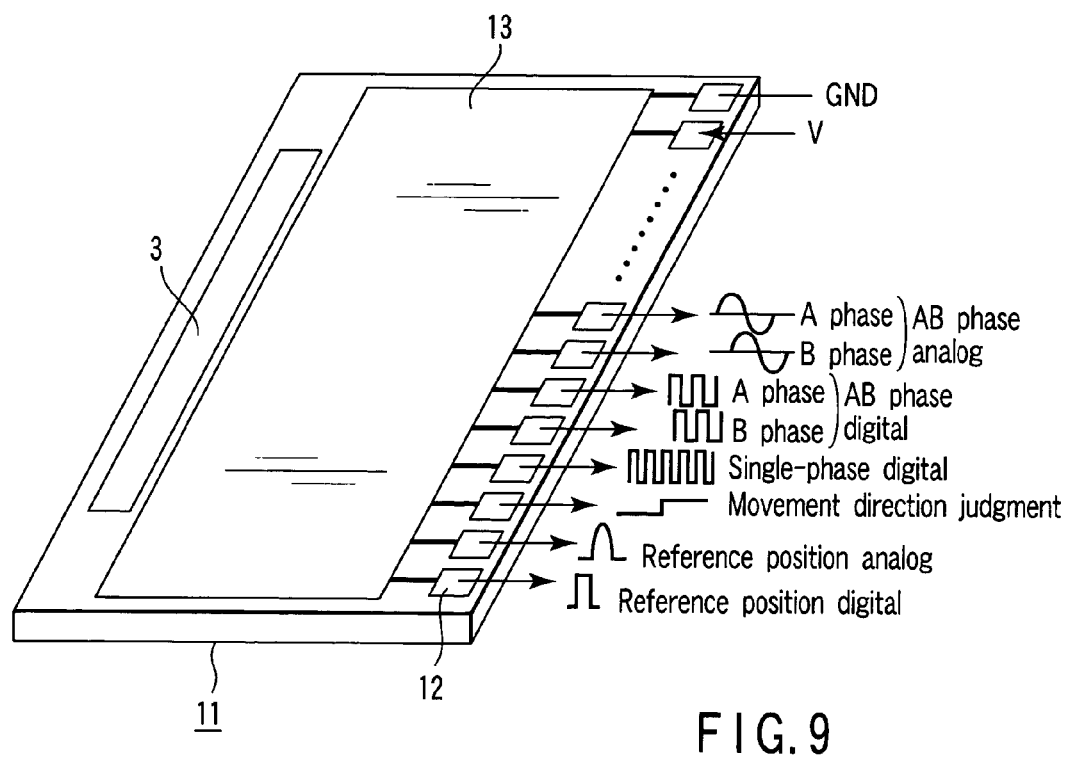
FIG. 9 is a view showing an example of a schematic view of the IC in the sensor head which independently outputs a signal from each extraction electrode of the IC in the sensor head.

Moreover, as shown in FIG. 9, various output signals such as AB phase analog signals, AB phase digital signals, single-phase digital signals, analog or digital reference position signals and others may be allowed to be output from independent extraction electrodes 12, thereby enabling on/off switching of various output signals by using the signal output setup switching portion 56. As a result, when an analog signal with a high signal-to-noise ratio should be obtained, the analog signal with a high signal-to-noise ratio on which digital noises are not superimposed can be obtained by setting digital signals to an off state and enabling output of analog signals alone from an output terminal.

Figure 10:
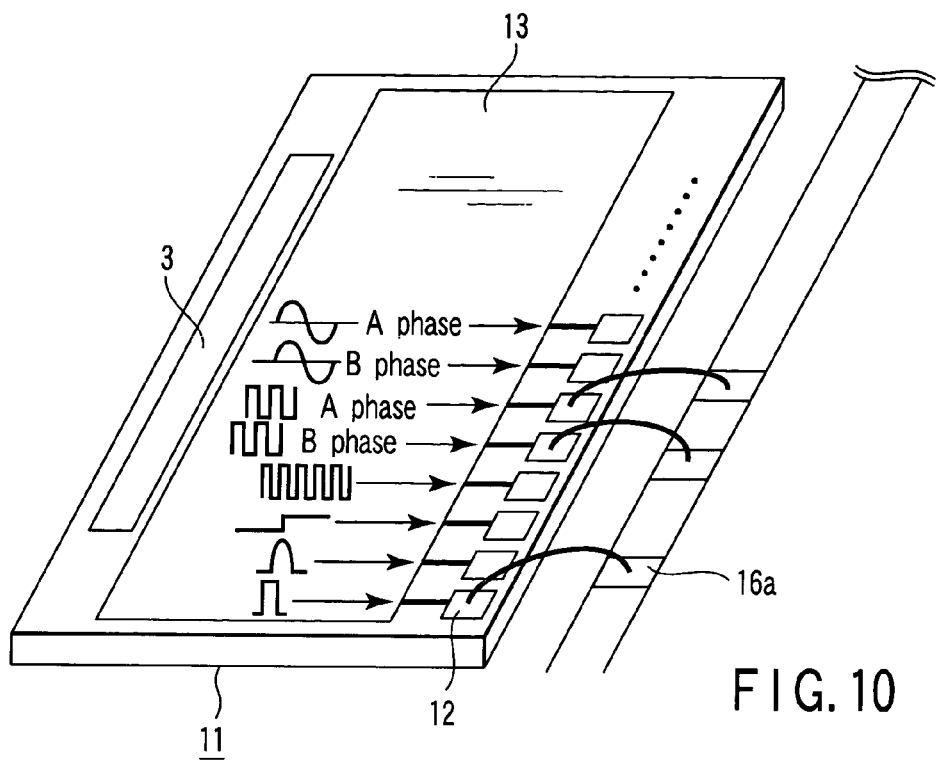
FIG. 10 is a view showing another example of the schematic view of the IC in the sensor head which independently outputs a signal from each extraction electrode of the IC in the sensor head.

Additionally, as shown in FIG. 10, various output signals such as AB phase analog signals, AB phase digital signals, single-phase digital signals, analog or digital reference position signals and others may be allowed to be output from independent extraction electrodes 12, and the extraction electrodes 12 and external electrodes 16*a* may be selectively connected with each other through electroconductive wires. Here, the external electrode 16*a* means an electrode formed to a package of the sensor, an electrode and a cabling formed on a flexible printed board and others.

Fourth Embodiment

Figure 11:
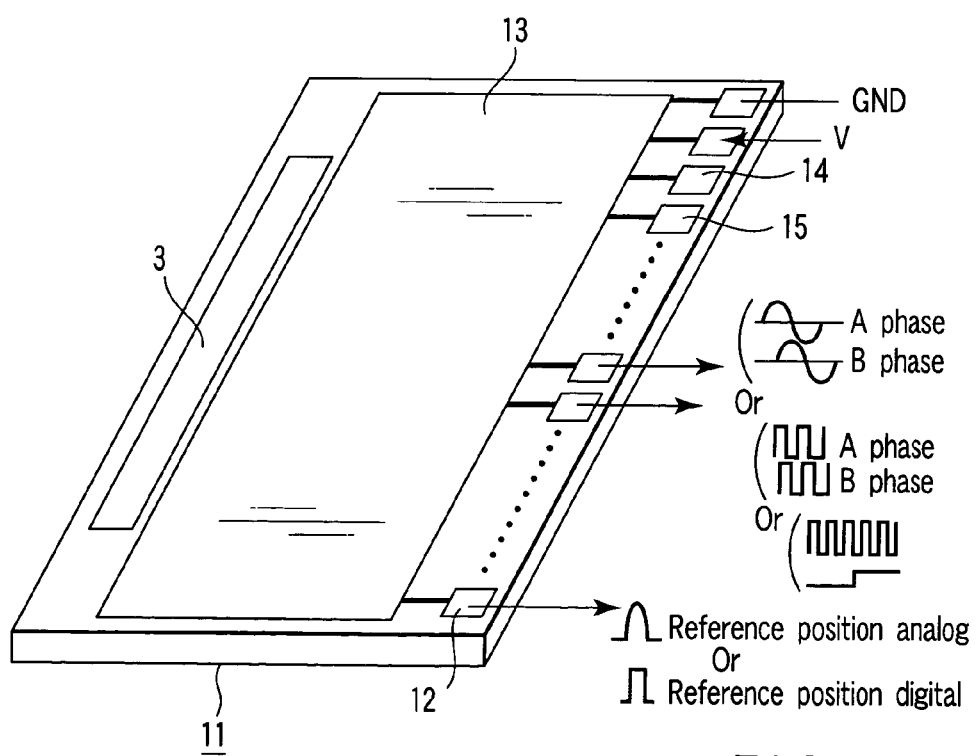
FIG. 11 is a schematic view of an IC in a sensor head in an encoder according to a fourth embodiment of the present invention.
Figure 13:
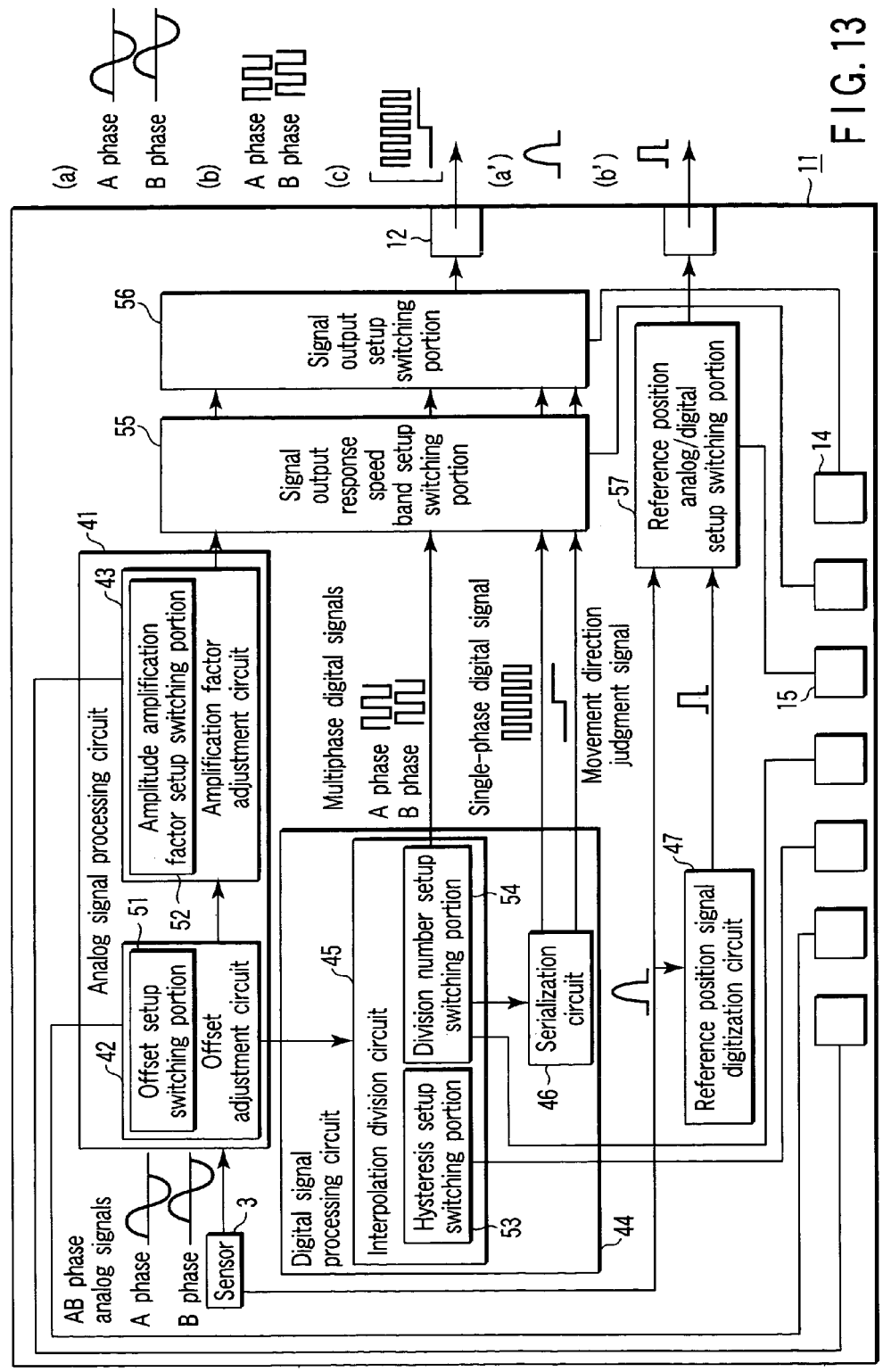
FIG. 13 is a block diagram showing an internal structure of a sensor head in an encoder according to a fourth embodiment.

A fourth embodiment according to the present invention will now be described. FIG. 11 is a schematic view of an IC in a sensor head according to the fourth embodiment, and FIG. 13 is a view showing an internal structure of the IC 11 in FIG. 11. Here, in FIG. 11, a signal output setup switching electrode 14 which is an electrode corresponding to the signal output setup switching portion 56 and a reference position analog/digital setup switching electrode 15 which is an electrode corresponding to the reference position analog/digital setup switching portion 57 are provided in addition to the extraction electrodes 12 in FIG. 8.

In the fourth embodiment, various setup switching electrodes are provided to the extraction electrodes 12, and potentials given to these electrodes or impedances connected to the setup switching electrodes are switched, thereby performing setup switching. As an example of such setup switching, FIG. 12A shows a relationship between a potential of the signal output setup switching electrode 14 and an output signal mode corresponding to this potential, and FIG. 12B shows a relationship between a potential of the reference position analog/digital setup switching electrode 15 and an output signal mode corresponding to this potential.

That is, in the fourth embodiment, as shown in FIG. 12A, a potential given to the signal output setup switching electrode 14 can be switched on three stages, i.e., low, middle and high. That is, in the fourth embodiment, when a potential of the signal output setup switching electrode 14 is, e.g., a high potential, AB phase analog signals are output. Further, AB phase digital signals are output when a potential of the signal output setup switching electrode 14 is a middle potential, and a set of a single-phase digital signal and a movement direction judgment signal is output when this potential is a middle potential.

Here, the signal output setup switching portion 56 electrically connected with the signal output setup switching electrode 14 comprises, e.g., a semiconductor analog switch circuit. In such a structure, a potential of the signal output setup switching electrode 14 serves as a switch, and one of a set of AB phase analog signals, a set of AB phase digital signals, and a set of a single-phase digital signal and a movement direction judgment signal is selected.

It is to be noted that an impedance may be connected to the signal output setup switching electrode 14 in place of giving a potential thereto so that this impedance can serve as a switch.

Furthermore, as shown in FIG. 12B, a potential of the reference position analog/digital setup switching electrode 15 can be switched on two stages, i.e., low and high. That is, a reference position analog signal is output when a potential of the reference position analog/digital setup switching electrode 15 is high, and a reference position digital signal is output when this potential is a low potential.

Here, the reference position analog/digital setup switching portion 57 electrically connected with the reference position analog/digital setup switching electrode 15 comprises, e.g., a semiconductor analog switch circuit. In such a structure, a potential of the reference position analog/digital setup switching electrode 15 serves as a switch, and one of the reference position analog signal and the reference position digital signal is selected.

It is to be noted that an impedance may be connected to the signal output setup switching electrode 15 in place of giving a potential thereto so that its impedance value can function as a switch.

Furthermore, structures of the scale 1, the positional information output device 7 and others are the same as those in the first embodiment, and a flow of signals to various setup switching portions from the sensor 3 is the same as that in the second embodiment, thereby eliminating the explanation.

It is to be noted that the description has been given as to the setup switching in the signal output setup switching portion 56 and the reference position analog/digital setup switching portion 57 in the fourth embodiment, but it is needless to say that the same setup switching electrodes may be provided to other setup switching portions such as the division number setup switching portion and various kinds of setup switching can be performed by switching potentials of these electrodes.

As described above, according to the fourth embodiment, since one type of the IC 11 enables various signal output modes, e.g., a mode for various AB phase analog signals, a mode for various AB phase digital signals, a mode for various single-phase digital signals, a mode for analog or digital reference position signals, the same sensor head can cope with many positional information output devices 7 or control devices 8 having different signal input specifications. Moreover, since mass-production of the IC 11 facilitates a reduction in cost and enables a reduction in size, the small sensor head with a low cost can be obtained.

Here, each structure in the fourth embodiment can be of course modified and changed in many ways. For example, as described in conjunction with the third embodiment, all of the various setup switching portions do not have to be provided in the IC 11, and arrangements of the various setup switching portions in the IC can be also changed. That is, even if some of structures in FIG. 2 are eliminated or their arrangements are different, realizing a sensor head satisfying desired sensor performances can suffice.

Additionally, analog signals are not restricted to the AB phase signals whose phases are shifted 90 degrees with respect to each other, and they may be a plurality of analog signals having predetermined phase differences. Digital signals may be multiphase signals in accordance with such analog signals.

Further, as structures of the various setup switching portions, there can be considered various structures, e.g., a structure using a thin-film electrical pattern or a structure using a non-volatile memory.

Furthermore, by setting a plurality of potentials with respect to one setup switching electrode and mixing, e.g., a function of the division number setup switching portion 54, a function of then amplitude amplification factor setup switching portion 52 and a function of the signal output setup switching portion 56, one setup switching electrode can be used to perform switching between the regular mode and the switching mode of the AB phase analog signals, switching of a division number of the AB phase digital signals and switching of signal output modes.

Fifth Embodiment

A fifth embodiment according to the present invention will now be described. Here, structures of a scale 1, a positional information output device 7 and others are the same as those in the first embodiment, and a flow of signals from a sensor 3 to various setup switching portions is the same as that in the second embodiment, thereby eliminating the explanation.

Figure 14:
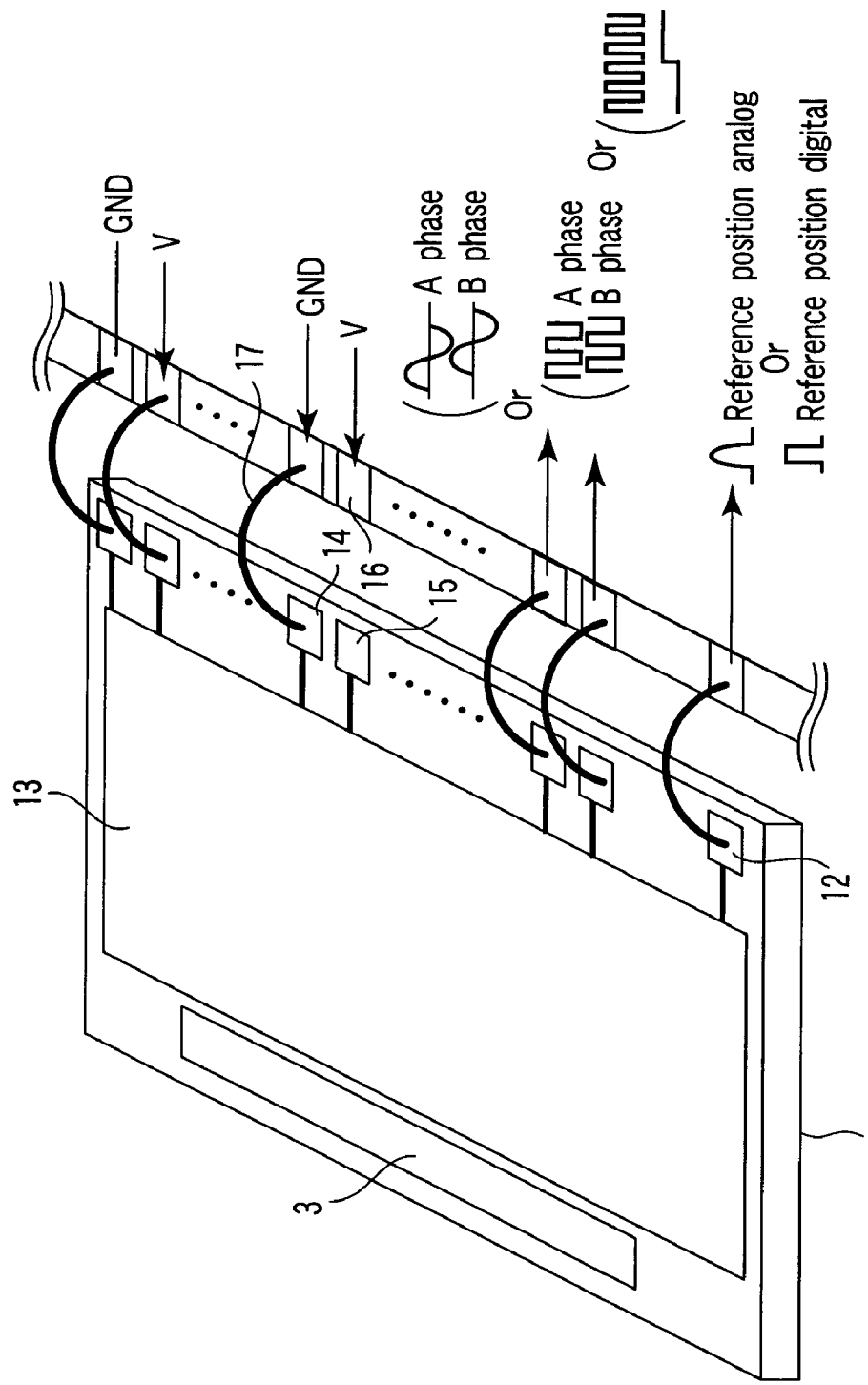
FIG. 14 is a schematic view of an IC in a sensor head in an encoder according to a fifth embodiment of the present invention.

In the fifth embodiment, electrodes attached to a package of a sensor head 2 (which will be referred to as package electrodes hereinafter) are utilized in order to switch the setups of setup switching portions. That is, in the fifth embodiment, as shown in FIG. 14, the setup of each of various setup switching portions is switched based on presence/absence of electrical connection between extraction electrodes 12 of an IC 11 and package electrodes 16 having predetermined potentials given thereto. Here, FIG. 14 shows an example in which signal output setup switching electrodes 14, reference position analog/digital setup switching electrodes 15 are electrically connected with the package electrodes through wires 17.

Here, FIG. 15A shows a relationship between a potential of the package electrode 16 and an output signal mode corresponding to this potential, and FIG. 15B shows a relationship between a potential of the package electrode 16 and an output signal mode of a reference position signal corresponding to this potential. As shown in FIG. 15A, AB phase analog signals are output when each signal output setup switching electrode 14 is not electrically connected with each package electrode 16 through the wire, and AB phase digital signals are output when each signal output setup switching electrode 14 is electrically connected with each package electrode 16 having a ground (GND) potential through the wire. Furthermore, a set of a single-phase digital signal and a movement direction judgment signal is output when each signal output setup switching electrode 14 is electrically connected with each package electrode 16 having a predetermined potential (V) through the wire.

Moreover, as shown in FIG. 15B, reference position analog signals are output when the reference position analog/digital setup switching electrodes 15 are not electrically connected with the package electrodes 16 through the wires, and reference position digital signals are output when the reference position analog/digital setup switching electrodes 15 are electrically connected with the package electrodes 16 having the GND potential through the wires.

Here, the signal output setup switching electrode 14 and the reference position analog/digital setup switching electrode 15 are respectively electrically connected with a signal output setup switching portion 56 and a reference position analog/digital setup switching portion 57 like the fourth embodiment, and the signal output setup switching portion 56 and the reference position analog/digital setup switching portion 57 may comprise, e.g., a semiconductor analog switch circuit like the fourth embodiment. However, when the electrical wire is not connected with the setup switching electrode, a potential is not specified. In this case, it is good enough to form a circuit by which an intermediate potential between V and GND is input to the signal output setup switching portion 56 and the reference position analog/digital setup switching portion 57, for example.

Here, although not shown in FIG. 14, it is needless to say that the setup can be switched by likewise providing a setup switching electrode to the IC 11 with respect to any other setup switching portion such as a division number setup switching portion 54 and electrically connecting this electrode with the package electrode 16 through the wire.

As described above, according to the fifth embodiment, one type of the IC 11 enables various signal output modes such as a mode for various AB phase analog signals, a mode for various AB phase digital signals, a mode for various single-phase digital signals and a mode for analog or digital reference position signals, which leads to a reduction in cost due to mass-production. Additionally, the sensor head can be reduced in size since it can comprise an IC.

Here, each structure in the fifth embodiment can be of course modified and changed in many ways. For example, in the fifth embodiment, the same modifications and changes as those in the third embodiment can be performed. Furthermore, electrical connection between the setup switching electrode and the package electrode 16 in the IC 11 is not restricted to the wire, and this connection may be achieved by using, e.g., an electroconductive adhesive using a silver paste or the like.

Moreover, by providing the package electrodes 16 which can give a plurality of potentials, setup switching of the plurality of setup switching portions can be performed by using one setup switching electrode provided to the IC 11.

Sixth Embodiment

A sixth embodiment according to the present invention will now be described. Here, structures of a scale 1, a positional information output device 7 and others are the same as those in the first embodiment, and a flow of signals from a sensor 3 to various setup switching portions is the same as that in the second embodiment, thereby eliminating the explanation.

In the sixth embodiment, as shown in FIG. 16, extraction electrodes 12 of an IC 11 are electrically connected with switch electrodes provided to package electrodes 16 of a sensor head 2 through wires 17, and setup switching is executed by turning on/off the switch.

Figure 17:
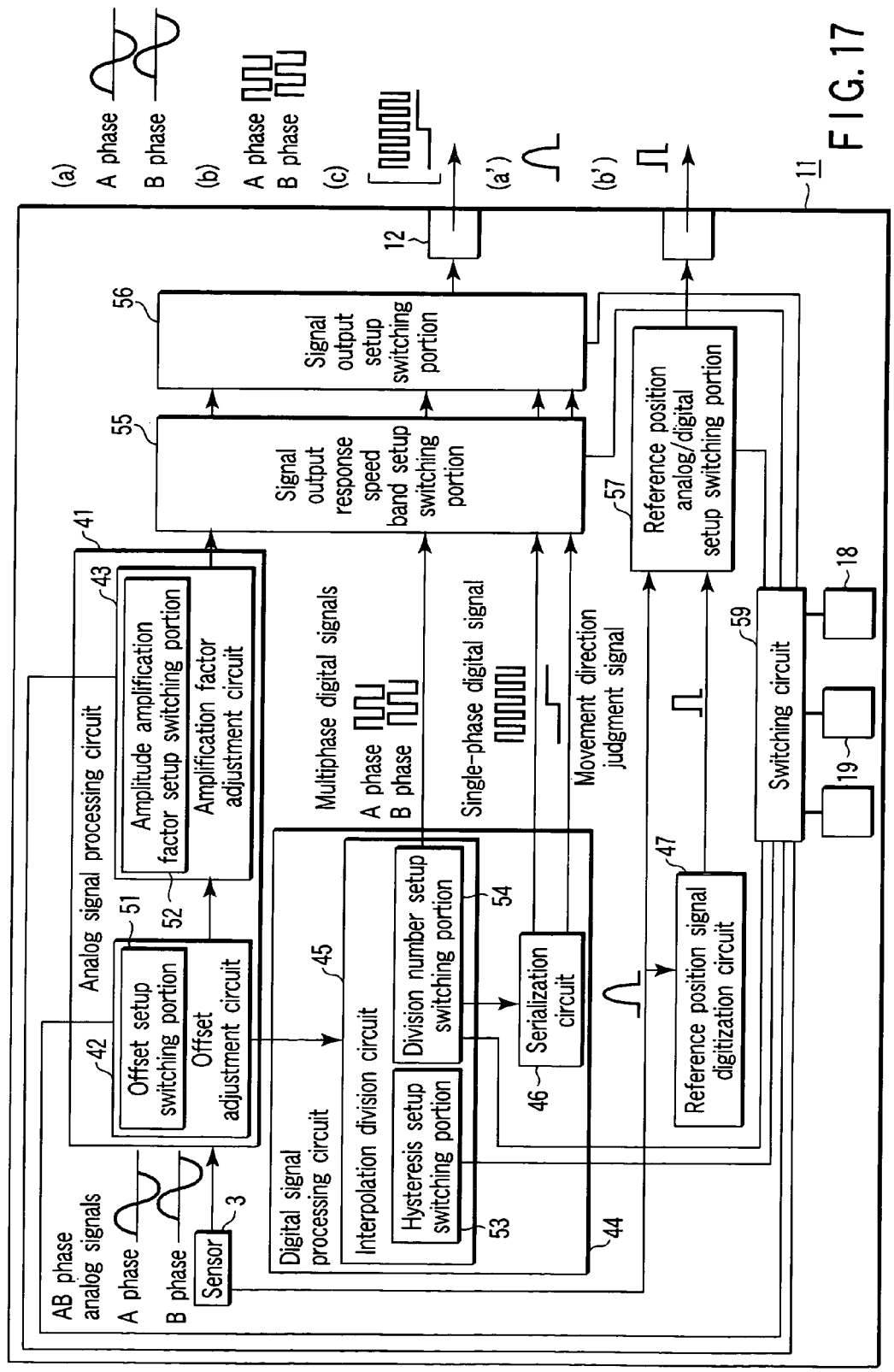
FIG. 17 is a block diagram showing an internal structure of the sensor head in the encoder according to the sixth embodiment.

Here, FIG. 16 shows an example in which respective setup switching electrodes of two setup switching electrodes 18 and 19 are electrically connected with switch electrodes SW1 and SW2 through wires. Further, as shown in FIG. 17, the setup switching electrodes 18 and 19 are electrically connected with various setup switching portions through a switching circuit 59. This switching circuit 59 performs setup switching of the various setup switching portions in accordance with potential states of the setup switching electrodes 18 and 19.

Figures 18, 19:
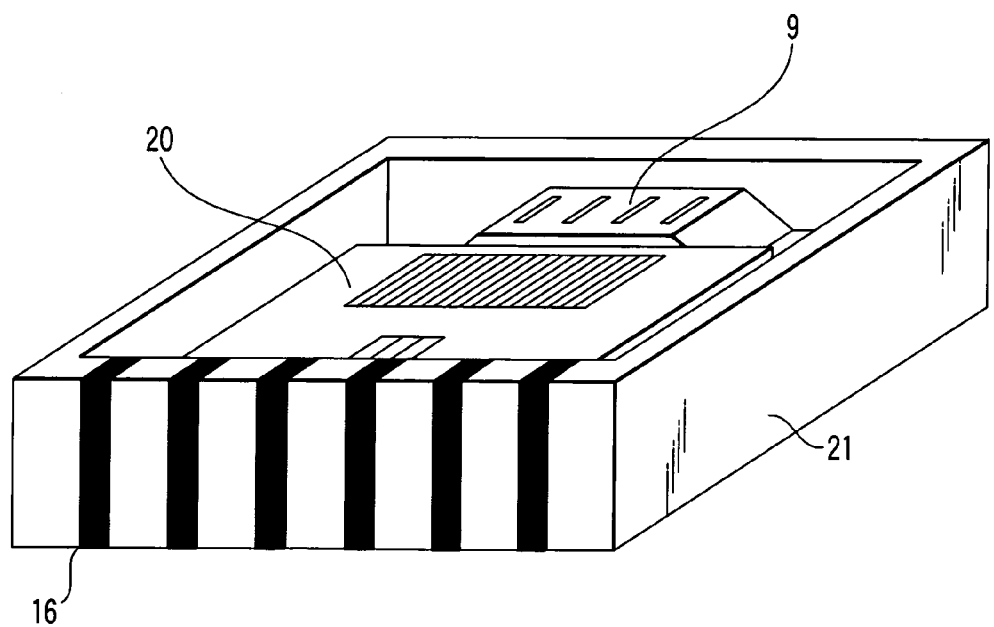
FIG. 18 is a view showing an example of setup switching of a setup switching portion in the sixth embodiment.
FIG. 19 is a schematic view of a sensor head in an encoder according to a seventh embodiment of the present invention.
Figure 20A:
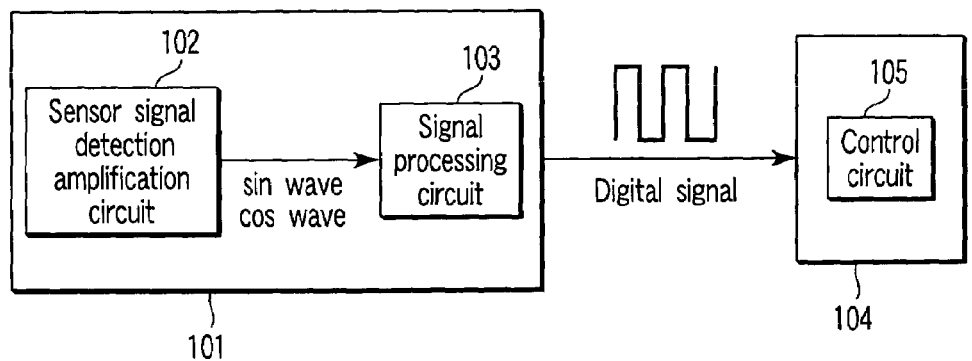
FIGS. 20A and 20B are block diagrams each showing a structure of a prior art.
Figure 20B:
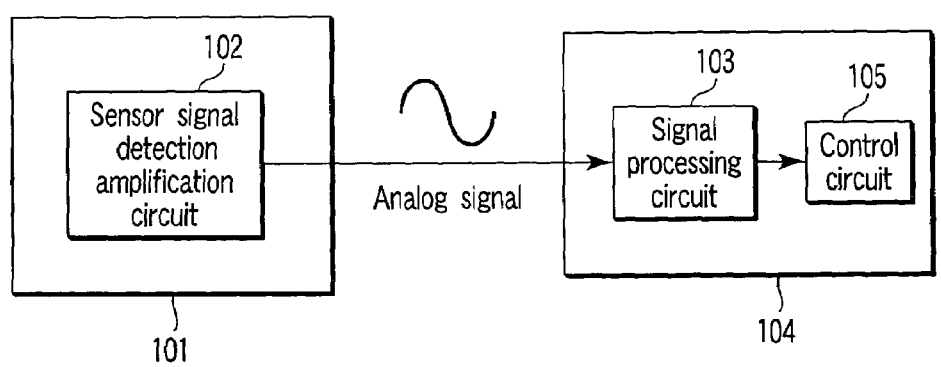

Here, FIG. 18 shows an example of setup switching of the setup switching portions based on on/off combinations of the respective switch electrodes. In the example shown in FIG. 18, the setup switching of an amplitude amplification factor setup switching portion 52, a division number setup portion 54 and a signal output setup switching portion 56 is performed by turning on/off the setup switching electrodes 18 and 19. It is assumed that turning on the switch electrode SW provides a V potential and turning off the same provides a GND potential. If the number of switch electrodes is two, four types of setup switching are enabled in total.

Here, if SW1 and SW2 are both off and in the GND potential state, a switch potential with which AB phase analog signals in the inspection mode are selected from the switching circuit 59 to the amplitude amplification factor setup switching portion 52 is constituted in the switching circuit 59, and a logic circuit which sends a switch potential with which AB phase analog signals are selected to the signal output setup switching portion 56 is constituted in the switching circuit 59. As a result, the AB phase analog signals in the inspection mode are output from the sensor head. Furthermore, if SW1 is on and in the V potential state whilst SW2 is off and in the GND potential state, a logic circuit which sends from the switching circuit 59 to the division number setup switching portion 54 a switch potential with which AB phase digital signals in a low-resolution mode obtained by just binarizing AB phase analog signals are selected is constituted in the switching circuit 59, and a logic circuit which sends to the signal output setup switching portion 56 a switch potential with which AB phase digital signals are selected is constituted in the switching circuit 59. As a result, the AB phase digital signals in the low-resolution mode are output from the sensor head. Likewise, it is sufficient to constitute in the switching circuit 59 a logic circuit which outputs AB phase analog signals in the regular mode from the sensor head if SW1 and SW2 are both on and in the V potential state, and constitute in the switching circuit 59 a logic circuit which outputs AB phase digital signals in a high-resolution mode from the sensor head if SW1 is off and in the GND potential state whilst SW2 is on and in the V potential state. Here, forming, e.g., semiconductor analog switches in the amplification factor setup switching portion 52, the signal output setup switching portion 56 and the division number setup switching portion 54 can suffice.

Moreover, if the number of the switch electrodes SW is three, eight types of setup switching are possible.

As described above, according to the sixth embodiment, since one type of the sensor head can be used to output signals in various signal output modes, e.g., a mode for various AB phase analog signals, a mode for various AB phase digital signals, a mode for various single-phase digital signals, a mode for analog or digital reference position signals, one type of the sensor head can support many positional information output devices 7 or control devices 8 having different signal input specifications. Additionally, since mass-production of the IC 11 facilitates a reduction in cost and enables a reduction in size, the small sensor head with a low cost can be obtained.

Further, since the offset can be reduced as much as possible by the offset setup switching portion 51 and the interpolation accuracy in the interpolation division circuit 45 can be improved, a further accurate sensor head can be obtained.

Furthermore, amplitudes can be readily changed by the amplitude amplification factor setup switching portion 52 depending on the shipping inspection mode and the regular mode of the sensor head. As a result, performing the inspection in the inspection mode in which a standard width is narrower than the AB phase analog amplitude standard can avoid problems due to AB phase amplitude errors in the regular mode.

Here, each structure in the sixth embodiment can be of course modified and changed in many ways. For example, the sixth embodiment can be modified and changed in many ways like the third embodiment. Moreover, the electrical connection between the setup switching electrodes 18 and 19 of the IC 11 and the switch electrodes SW1 and SW2 is not restricted to the wires, and this electrical connection may be achieved by an electroconductive adhesive using a silver paste or the like.

Seventh Embodiment

A seventh embodiment according to the present invention will now be described. FIG. 19 schematically shows an IC 20 in which the light source 9, the light source drive circuit 10, the sensor 3, various signal processing circuits and various setup switching portions (including the light output setup switching portion 58 for the light source) are integrated, and a package 21 of this IC 20.

Here, structures of a scale 1, a positional information output device 7 and others are the same as those in the first embodiment, and a flow of signals from the sensor 3 is the same as that in the second embodiment, thereby eliminating the explanation.

An encoder according to the seventh embodiment is an optical encoder having the light source 9 in the sensor head. Therefore, the sensor 3 is a light sensitive sensor, and an optical pattern with a predetermined cycle is formed to the scale 1. Here, in the seventh embodiment, a light output from the light source 9 can be switched in accordance with an amplitude specification of AB phase analog signals. For example, if a small amplitude of the AB phase analog signals can suffice, a life duration of the light source 9 can be prolonged by keeping a light output from the light source 9 low. It is to be noted that the light source 9 in this example includes a light emitting diode (LED), a laser diode (LD) or the like. That is, as the light source 9 used in the seventh embodiment, any light source can be used as long as it can form an image according to a cyclic optical pattern of the scale 1 on the sensor 3.

Here, the connection between the package electrodes 16 and the extraction electrodes, the switching mode for the potentials of the setup switching electrodes and others comply with the fifth or sixth embodiment.

As described above, according to the seventh embodiment, the same effects as those in the third to sixth embodiments can be obtained, and the effect of increasing the life duration of the light source can be obtained by providing the light output setup switching portion 58 for the light source.

Here, each structure in the seventh embodiment can be of course modified and changed in many ways. For example, in this seventh embodiment, the same various modifications and changes as those of the third to sixth embodiments are possible. Further, in the seventh embodiment, the output switching in the light output setup switching portion 58 for the light source is automated, and the auto power control by which a light intensity which enters the light sensitive sensor is always kept constant or an amplitude of analog signals is always kept constant is provided. As a result, a light intensity which enters the light sensitive sensor can be always kept constant or an amplitude of analog signals can be always kept constant, and the highly accurate optical encoder can be obtained by stabilizing encoder signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An encoder comprising:
a scale having a pattern with a predetermined cycle; and
a single sensor head having an integrated circuit which includes at least a signal processing portion which subjects, to signal processing, a plurality of analog signals in accordance with a relative displacement with the scale to thereby generate various output signals having different characteristics, and a setup switching portion which selectively performs setup switching concerning the output signals having different characteristics according to a requirement specification of the encoder, wherein
the setup switching portion has a memory for performing the setup switching, and
the setup switched by the setup switching portion is to change setup information which is recorded in the memory.

2. The encoder according to claim 1, wherein the memory has a non-volatile memory.

3. An encoder comprising:
a scale having a pattern with a predetermined cycle; and
a single sensor head having an integrated circuit which includes at least a signal processing portion which subjects, to signal processing, a plurality of analog signals in accordance with a relative displacement with the scale to thereby generate various output signals having different characteristics, and a setup switching portion which selectively performs setup switching concerning the output signals having different characteristics according to a requirement specification of the encoder, wherein
at least one setup switching electrode which performs the setup switching is electrically connected with the setup switching portion, and
the setup switched by the setup switching portion is to switch an electrical connection state between the setup switching electrode and an electrode having a predetermined potential which is formed at a package of the sensor head.

4. The encoder according to claim 3, wherein at least one setup switching electrode which performs the setup switching is electrically connected with the setup switching portion, and
the setup switched by the setup switching portion is to switch a potential given to the setup switching electrode or to switch an impedance connected to the setup electrode.

5. The encoder according to claim 3, wherein a plurality of setup switching electrodes which perform the setup switching are electrically connected to the setup switching portion, and a plurality of switches are electrically connected to the plurality of setup switching electrodes, and
the setup switched by the setup switching portion is to switch combinations of states of the plurality of switches electrically connected with the plurality of setup switching electrodes.

6. An encoder comprising:
a scale having a pattern with a predetermined cycle; and
a single sensor head having an integrated circuit which includes at least a signal processing portion which subjects, to signal processing, a plurality of analog signals in accordance with a relative displacement with the scale to thereby generate various output signals having different characteristics, and a setup switching portion which selectively performs setup switching concerning the output signals having different characteristics according to a requirement specification of the encoder, wherein
the sensor head has at least three setups which are able to be switched by the setup switching portion.

7. The encoder according to claim 6, wherein the setup of the sensor head is a setup by which at least one of at least three types of output signals is selectively output from the sensor head.

8. The encoder according to claim 3, wherein the signal processing portion has an analog signal processing circuit which processes the plurality of analog signals in accordance with the relative displacement in the analog signal state, and a digital signal processing circuit which generates a digital signal from the plurality of analog signals, and the setup switched by the setup switching portion is to switch the signal output from the sensor head to both or one of an output signal from the analog signal processing circuit and an output signal from the digital signal processing circuit.

9. The encoder according to claim 3, wherein the signal processing portion has an interpolation division circuit which subjects, to interpolation division processing, the plurality of analog signals in accordance with the relative displacement, and the setup switched by the setup switching portion is to switch a division number in the interpolation division processing.

10. The encoder according to claim 3, wherein the signal processing portion has a digital signal processing circuit which generates digital signals in accordance with a plurality of output formats from the plurality of analog signals in accordance with the relative displacement, and the setup switched by the setup switching portion is to switch a signal output from the sensor head to at least one of the plurality of output formats.

11. The encoder according to claim 10, wherein the output formats are at least two of a two-phase parallel output, a multi-bit output, a serial output and an output compatible with a USB interface.

12. The encoder according to claim 3, wherein the signal processing portion has an amplification factor adjustment circuit which sets an amplification factor of amplitudes of the plurality of analog signals in accordance with the relative displacement, and the setup switched by the setup switching portion is to switch a setup of the amplification factor of the amplitudes.

13. The encoder according to claim 3, wherein the signal processing portion has an offset adjustment circuit which sets an offset between each amplitude central potential of the plurality of analog signals in accordance with the relative displacement and a reference potential, and the setup switched by the setup switching portion is to switch a setup of the offset.

14. The encoder according to claim 3, wherein the signal processing portion has an analog signal processing circuit and a digital signal processing circuit, and the setup switched by the setup switching portion is to switch a setup of a response speed band of the analog signal processing circuit or the digital processing circuit when outputting signals from the sensor head.

15. The encoder according to claim 3, wherein the signal processing portion has a digital signal processing circuit which generates a plurality of digital signals from the plurality of the analog signals in accordance with the relative displacement, and the setup switched by the setup switching portion is to switch a setup of a width of a hysteresis given to a threshold voltage when generating the plurality of digital signals.

16. The encoder according to claim 3, wherein the signal processing portion and the setup switching portion comprise one integrated circuit.

17. The encoder according to claim 3, wherein the encoder is an optical encoder which has a light source and a light sensitive sensor in the sensor head, and the setup switching portion performs setup switching of a light output from the light source.

18. The encoder according to claim 17, wherein the setup switching portion performs setup switching between a constant current mode in which a drive current of the light source is kept constant, and an auto power control mode in which a light intensity which enters the light sensitive sensor is always kept constant or amplitudes of the plurality of analog signals are always kept constant.

19. The encoder according to claim 6, wherein the signal processing portion has a digital signal processing circuit which generates digital signals in accordance with a plurality of output formats from the plurality of analog signals in accordance with the relative displacement, and the setup switched by the setup switching portion is to switch a signal output from the sensor head to at least one of the plurality of output formats.

20. The encoder according to claim 19, wherein the output formats are at least two of a two-phase parallel output, a multi-bit output, a serial output and an output compatible with a USB interface.

21. The encoder according to claim 6, wherein the signal processing portion has an amplification factor adjustment circuit which sets an amplification factor of amplitudes of the plurality of analog signals in accordance with the relative displacement, and the setup switched by the setup switching portion is to switch a setup of the amplification factor of the amplitudes.

22. The encoder according to claim 6, wherein the signal processing portion has an offset adjustment circuit which sets an offset between each amplitude central potential of the plurality of analog signals in accordance with the relative displacement and a reference potential, and the setup switched by the setup switching portion is to switch a setup of the offset.

23. The encoder according to claim 6, wherein the signal processing portion has an analog signal processing circuit and a digital signal processing circuit, and the setup switched by the setup switching portion is to switch a setup of a response speed band of the analog signal processing circuit or the digital processing circuit when outputting signals from the sensor head.

24. The encoder according to claim 6, wherein the signal processing portion has a digital signal processing circuit which generates a plurality of digital signals from the plurality of the analog signals in accordance with the relative displacement, and the setup switched by the setup switching portion is to switch a setup of a width of a hysteresis given to a threshold voltage when generating the plurality of digital signals.

25. The encoder according to claim 6, wherein the signal processing portion and the setup switching portion comprise one integrated circuit.

26. The encoder according to claim 6, wherein the encoder is an optical encoder which has a light source and a light sensitive sensor in the sensor head, and the setup switching portion performs setup switching of a light output from the light source.

27. The encoder according to claim 26, wherein the setup switching portion performs setup switching between a constant current mode in which a drive current of the light source is kept constant, and an auto power control mode in which a light intensity which enters the light sensitive sensor is always kept constant or amplitudes of the plurality of analog signals are always kept constant.

* * * * *